Figure 1:
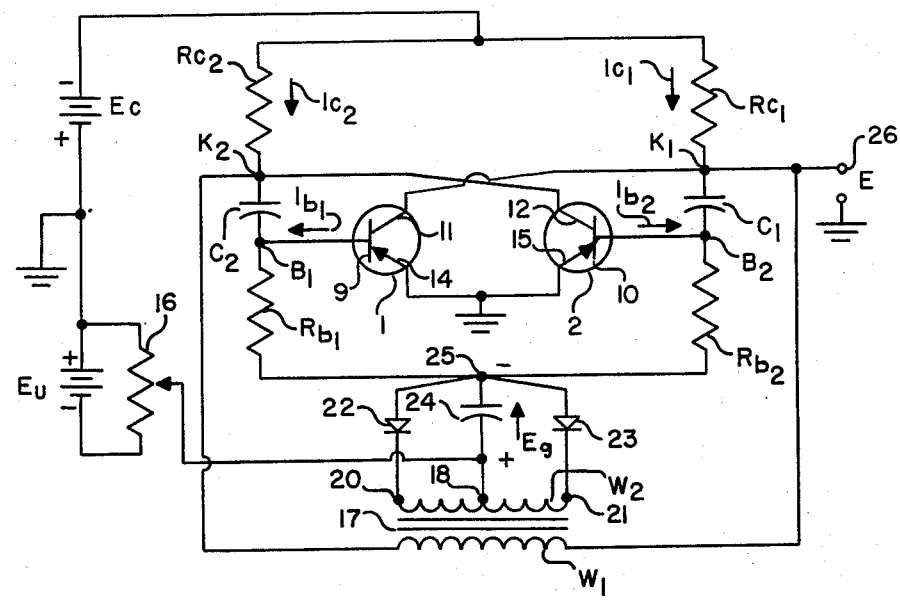

Jan. 26, 1965         A. DERKS         3,167,725

SELF-STARTING TRANSISTOR RELAXATION GENERATOR

Filed Jan. 16, 1962         2 Sheets-Sheet 1

INVENTOR
ADRIAAN DERKS

BY Watson, Cole, Grindle & Watson

ATTORNEYS

INVENTOR
ADRIAAN DERKS

United States Patent Office 3,167,725
Patented Jan. 26, 1965

3,167,725
SELF-STARTING TRANSISTOR RELAXATION
GENERATOR
Adriaan Derks, Schiedam, Netherlands, assignor to The Nederlandse Organisatie voor Toegepast-Natuurwetenschappelijk Onderzoek ten behoeve van Nijverheid, Handel en Verkeer, The Hague, Netherlands, a corporation of the Netherlands
Filed Jan. 16, 1962, Ser. No. 166,662
Claims priority, application Netherlands, Jan. 25, 1961, 260,449
1 Claim. (Cl. 331—113)

The present invention relates to a transistor relaxation generator provided with two transistors linked in a common emitter circuit, which transistors are connected crosswise between base and collector by condensers and are provided with base and collector resistances.

Such transistor relaxation generators are known.

A drawback of these known generators is that, if they are selfstarting, they do not give off a pure block voltage, and if they give off a pure block voltage their selfstarting is unreliable.

The object of the present invention is to construct a selfstarting transistor relaxation generator which gives off a pure block voltage.

To this end the invention is characterized in that the supply voltage between base and emitter comprises a combination of an external voltage and of a voltage derived from the alternating voltage given off by the generator, whereby the magnitude of the external voltage is such that this voltage by itself is unable to give the collector current its saturation value; and in that the derived voltage takes on a value which is such that the collector current of the transistors, if these are conductive, has the saturation value.

Therefore, the supply voltage between base and emitter—hereinafter called base-voltage—is small when starting and large during operation.

At the small starting base-voltage the collector current does not show its saturation value, in this condition therefore the relaxation generator can start—as will be shown hereinafter.

If during operation the transistors are conductive, that is to say "open," the collector current always has its saturation value.

As is known, the generator then gives off a very pure block voltage.

It is known that in such a generator the relation between the base-voltage and the frequency of the generator shows a high degree of linearity.

This is very important for the use of the generator in telemetering systems in which the magnitude to be measured can be transformed into a voltage which, as external voltage, determines the frequency of the generator.

However, when known circuits giving off pure block voltages are used in telemetering systems, there is a risk that the great variations in the base-voltage may cause the generator to stop, after which it doesn't start of itself again. In such cases the circuit according to the invention always starts again of itself.

Preferably, the voltage derived from the generator alternating voltage is obtained by rectifying the generator alternating voltage.

One embodiment of the invention is characterized in that the primary winding of a transformer is conected between the collectors of the transistors, which transformer is provided with a secondary winding having a center tap which is connected to a terminal of a condenser the other terminal of which is connected to the transistors via the base resistances and is connected to the ends of the secondary winding via rectifiers, and in which the external voltage can be connected between the emitters and the center tap.

The invention will be further explained with the aid of a drawing showing a diagram of an embodiment of the invention and a diagram of the characteristic curves of the transistors.

Figure 4:
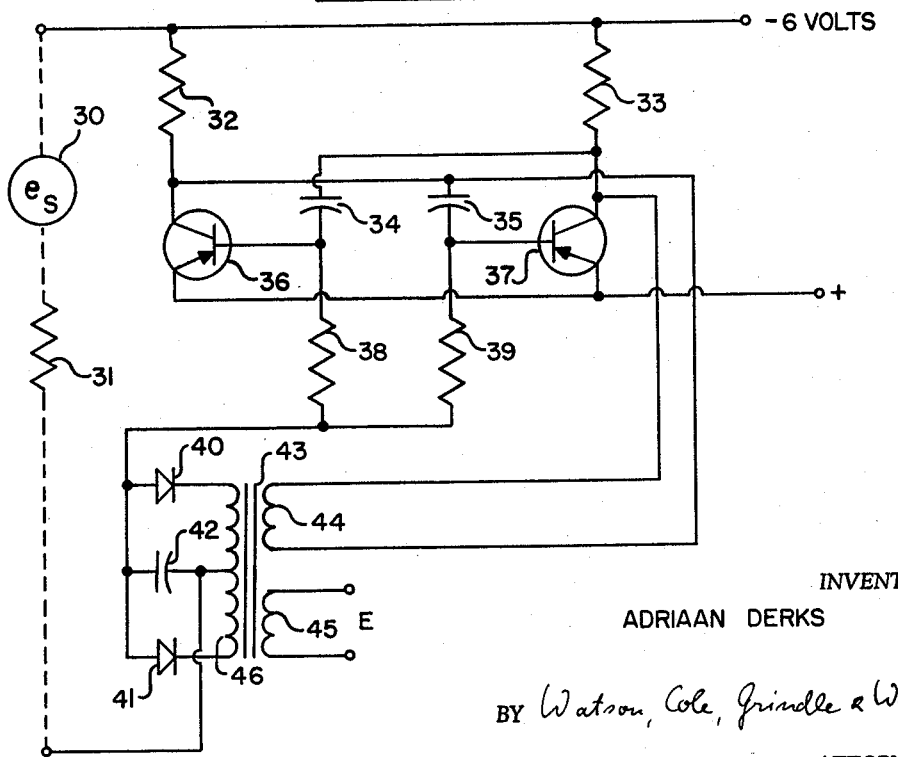
Figure 2:
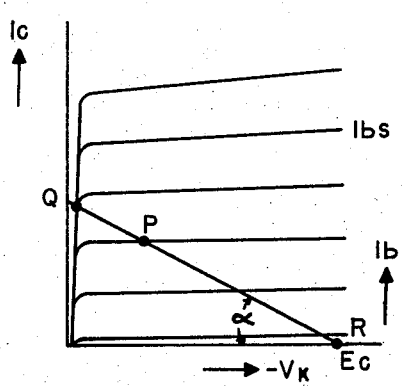
Figure 3:
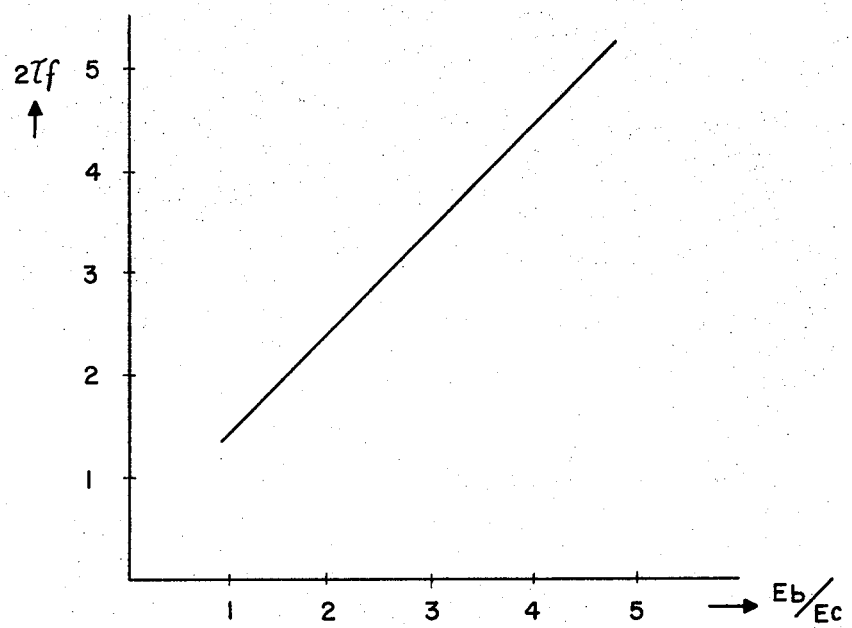

In this drawing are shown in:
FIG. 1: a diagram of an embodiment of the invention;
FIG. 2: a diagram of the characteristics of the transistors;
FIG. 3: a graph representing the relation between the frequency excited and the basis-voltage;
FIG. 4: a more complete embodiment of the invention.

FIGURE 1 shows the (p.n.p.) transistors 1 and 2 having their emitters 14 and 15 connected to earth.

The transistors 1 and 2 are connected with the voltage source $E_c$ via resistances $R_c$.

The condensers $C_1$ and $C_2$ connect the bases 9 and 10 of the transistors 1 and 2 crosswise to the collectors 12 and 11.

The external voltage $E_u$ is adjustable by the variable resistance 16 and is connected to the center tap 18 of the transformer 17 which, by the primary winding $W_1$ is further connected to the collectors 11 and 12.

The ends 20 and 21 of the secondary winding $W_2$ are connected to the center tap 18 of the transformer 17 via rectifiers 22 and 23 and via a condenser 24.

The common point 25 of the rectifiers 22 and 23 and the condenser 24 is connected to the bases 9 and 10 of the transistors 1 and 2 via the resistances $R_b$.

The block voltage E can be drawn between the terminal 26, which is connected to the collector 11 and to earth.

The voltage $E_g$ across the condenser 24 is zero when starting and $E_u$ is chosen in such a way that the collector current $I_c$ of the transistors 1 and 2 is not saturated.

After switching on $E_g$ increases up to the amplitude of the secondary transformer voltage. Now the base voltage $E_b$ in the series circuit $(E_u+E_g)$ is large enough to keep the transistors 1 and 2 in the saturated state during the period of their being "open."

FIGURE 2 of the drawing shows a diagram of the characteristics of the transistors 1 and 2 in which the base current $I_b$ is the parameter. The collector current $I_c$ is set out on the vertical axis and the potential $V_k$ which is the collector potential at the points $K_1$ and $K_2$ respectively is set out on the horizontal axis (see FIGURE 1).

The curve P.Q.R. is the working line.

The said line intersects the horizontal axis in the point $V_k=E_c$. As the voltage $V_k=-E_c+I_c.R_c$, the slope of the line is determined by $$tg\alpha = \frac{1}{R_c}$$

The collector current $I_c$ and the collector voltage $E_c$ are found for each value of the base current $I_b$ by intersection of the pertinent characteristic curve by the working line, if the load of the transistor is formed by $R_c$. P represents an arbitrary working point of the transistor on the working line for a transistor adjustment at which the collector current $I_c$ has not the saturation value. In the point R $I_c=0$. In said point the transistor is blocked.

This state is practically reached if $I_b=0$. The point Q is the saturation point; the collector current $I_c$ cannot increase any more however large the base current $I_b$ may get.

In this point $V_k$ is very small; this is the "open" state of the transistor.

If the circuit is designed in such a fashion that the transistors in the "open" state remain saturated, the relaxation generator will not start easily.

For if, when switching on the voltages $E_b$ and $E_c$, the charges on the condensers $C_1$ and $C_2$ are practically zero and the transistors 1 and 2 are "open," then a state of stability has been reached.

Both transistors are located in the point Q $I_b = I_{bs}$.

A small disturbance (noise) in the base current $I_b$ has no influence on $I_c$ or $V_k$; the amplification is zero.

A condition, in which one or both of the transistors are closed, can never be stable, because it is impossible for one or both of the bases to be permanently positive. Therefore, these cases need not be considered.

If both of the "open" transistors have their working point in P, then a small disturbance $I_b$ does indeed exert an influence on $I_c$ and $V_k$. A small increase of $I_{b_1}$ results in an increase of $I_{c_1}$, so that $V_{k_1}$ becomes less negative.

Hereby the current through $R_{b_2}$ increases and $V_{b_2}$ becomes more positive. Now $I_{b_2}$ decreases and so does $I_{c_2}$. This causes $V_{k_2}$ to become more negative and $I_{b_1}$ to increase by the condenser $C_2$ being charged. This continues until the transistor 2 is completely closed and $I_{c_1}$ has its maximal value. Now the condensers $C_1$ and $C_2$ are charged and the mechanism has started.

In conclusion it can be said for "open" transistors that the circuit starts well if the collector current $I_c$ has got its saturation value—the magnitude of the base voltage $E_b$ being the criterion of its being saturated or not—and that the circuit does not readily start if the collector current $I_c$ does not show the saturation value.

Therefore, the base voltage $E_b$ should be small when starting and large during operation.

This condition was satisfied in the embodiment of FIG. 1, by deriving an extra contribution $E_g$ for $$E_b = E_u + E_g$$

from the alternating part of the collector voltage.

In the FIGURE 3 is shown a graphical drawing which represents the connection between the frequency $f$ which has been excited and the base voltage $E_b$ according to the formula $$2\pi f = \frac{1}{\ln(1 + E_c/E_b)}$$

In this formula $\tau$ represents the time constant $$R_{b_1} \cdot C_2 = R_{b_2} \cdot C_1$$

This graph is valid for the saturated collector current $I_c$ at the "open" condition of the transistors.

From this graph it appears that $f$ changes practically linearly with $E_b$.

In telemetering systems this is important for the transformation of measuring values, which, whether or not transformed into voltages such as $E_u$, are supplied to the relaxation generator, which then gives off a block voltage E having a frequency $f$ which is linearly dependent on the measuring values.

FIG. 4 shows a more complete embodiment of the invention, designed for a central frequency of 1300 cycles.

In this embodiment the block voltage E is drawn from the winding 45 of the transformer 43.

The control voltage $E_u$, which is to be transformed into a frequency linearly dependent on it, is here represented by the voltage source 30 having the internal resistance 31.

The values for the elements listed below proved satisfactory in the embodiment of the invention.

It is evident that the invention can be realized in many ways, and that the embodiment of FIG. 4 is one of the many possibilities. Therefore, the values are only given by way of illustration and do not restrict the scope of the invention.

30 = −1.5 volt → +1.5 volt.
31 = <100 ohms.
32/33 = 560 ohms.
34/35 = 27.10$^{-9}$ farads.
36/37 = transistor OC 72 Philips.
38/39 = 39,000 ohms.
40/41 = diode OA 85 Philips
42 = 1.6.10$^{-6}$ farads.
46 = coil 2 x 900 windings of 0.1 mm. diameter.
45 = coil 180 windings of 0.1 mm. diameter.
44 = 900 windings of 0.1 mm. diameter.
43 = core Ferrox cube Philips type 5690801/3A.

I claim:

A self-starting transistor relaxation generator comprising two transistors, two condensers respectively connecting the base of each transistor to the collector of the other, a source of operating potential for the transistors with one terminal earthed, a circuit connecting the emitter electrodes of both transistors conductively to the earthed terminal of said potential, resistors connected to the base and collectors of each transistor, the other terminal of said source being connected through the collector resistors to the transistors, a voltage producing circuit coupled between the two base resistors and said earthed terminal including both a source of control voltage $E_u$ for producing conduction in said transistors at less than saturation and for controlling the frequency of oscillation of said generator and a source of signal voltage $E_g$ derived from the oscillations at the two said collector resistors by means of a transformer having a primary winding coupled therebetween and a secondary winding coupled with a rectifier circuit which is connected in series circuit with said source of control voltage for producing direct current flow in said voltage producing circuit, wherein the source of signal voltage $E_g$ is at a magnitude such that the collector current of said transistors when conducting in the presence of the control voltage $E_u$ is saturated.

References Cited by the Examiner

UNITED STATES PATENTS 2,950,446   8/60   Humez et al. _____ 331—113.1
3,065,309  11/62   Gifford _____ 331—113 X

OTHER REFERENCES

Article by Dorrell in IBM Technical Disclosure Bulletin, vol. 3, No. 9, February 1961.

ROY LAKE, *Primary Examiner.*

JOHN KOMINSKI, *Examiner.*